United States Patent [19]

Küehl

[11] 4,191,663
[45] Mar. 4, 1980

[54] PREPARATION OF SHAPE SELECTIVE ZEOLITE ALPHA AS CATALYST

[75] Inventor: Güenter H. Küehl, Cherry Hill, N.J.

[73] Assignee: Mobil Oil Corporation, New York, N.Y.

[21] Appl. No.: 900,850

[22] Filed: Apr. 26, 1978

[51] Int. Cl.² .................... B01J 29/06; C01B 33/28
[52] U.S. Cl. .................................. 252/455 Z; 423/328
[58] Field of Search ................... 252/455 Z; 423/328

[56] References Cited

U.S. PATENT DOCUMENTS

| | | | |
|---|---|---|---|
| 2,882,243 | 4/1959 | Milton | 252/455 Z |
| 3,314,752 | 4/1967 | Kerr | 252/455 Z |
| 3,373,109 | 3/1968 | Frilette et al. | 252/455 Z |
| 3,375,205 | 3/1968 | Wadlinger | 252/455 Z |

*Primary Examiner*—Carl F. Dees
*Attorney, Agent, or Firm*—Charles A. Huggett; Charles J. Speciale

[57] ABSTRACT

A method is provided for preparing a synthetic crystalline aluminosilicate zeolite Alpha containing platinum-group metal within the zeolite pores as synthesized, thereby providing shape-selective hydrogenation activity. The method comprises synthesizing the zeolite from a reaction mixture of controlled composition including a source of a cationic platinum-group metal complex. Catalysts made with the zeolite synthesized in accordance hereto are stable, both thermally and in the presence of steam, and exhibit beneficial shape-selectivity in catalysis and absorption.

45 Claims, No Drawings

PREPARATION OF SHAPE SELECTIVE ZEOLITE ALPHA AS CATALYST

BACKGROUND OF THE INVENTION

1. Field of the Invention

This invention relates to a method for synthesizing high-silica zeolite Alpha containing a platinum-group metal within the zeolite pores, as synthesized, and the use of the zeolite prepared in accordance hereto as a catalyst for organic compound, e.g. hydrocarbon compound, conversion.

2. Discussion of Prior Art

Zeolite Alpha and its conventional preparation are taught by U.S. Pat. No. 3,375,205, the disclosure of which is incorporated herein by reference. It has a distinctive X-ray diffraction pattern which identifies it from other known zeolites. Zeolites Alpha and ZK-4 (U.S. Pat. No. 3,314,752, the disclosure of which is incorporated herein by reference) are isostructural with zeolite A (U.S. Pat. No. 2,882,243, the disclosure of which is incorporated herein by reference).

Applicant knows of no prior art for preparing a high-silica zeolite Alpha containing a platinum-group metal within the zeolite pores. In fact, when one attempts to prepare zeolite Alpha by the convention method, but additionally with a source of tetrammine platinum (II) ions in the reaction mixture, the platinum complex will not survive the long heating period required for crystallization of the reaction mixture at the reaction conditions taught by U.S. Pat. No. 3,375,205. Further, it is not possible to ion exchange platinum-group metals into the pores of zeolites of type A structure, e.g. Alpha, because the critical diameter of the cationic platinum-group metal complex is larger than the diameter of the zeolite pores.

SUMMARY OF THE INVENTION

A method for preparing crystalline aluminosilicate zeolite Alpha containing a platinum-group metal within the pores of the zeolite is provided which comprises forming a reaction mixture containing sources of sodium oxide, tetramethylammonium oxide, aluminum oxide, silicon dioxide, a cationic platinum-group metal complex and water and having a composition, in terms of mole ratios of oxides, falling within the following ranges:

| | |
|---|---|
| $SiO_2/Al_2O_3$ | = 4.0–12.0 |
| $H_2O/(Na_2O + R_2O)$ | = 15.0–40.0 |
| $(Na_2O + R_2O)/Al_2O_3$ | = 2.0–7.0 |
| $Na_2O/(Na_2O + R_2O)$ | = 0.2–0.75 |
| $M/Al_2O_3$ | = $10^{-6}$–0.06 | wherein R is a tetramethylammonium cation and M is a platinum-group metal, aging said mixture for from about 2 hours to about 100 hours at a temperature of from about 10° C. to about 70° C., preferably from about 10 hours to about 40 hours at about ambient temperature and thereafter heating the mixture at a temperature of from about 80° C. to about 150° C. for a period of time of from about 2 hours to about 72 hours. Thereafter, the crystals formed during the heating step are separated from the liquid and recovered. A more preferred temperature range for the heating step is from about 90° C. to about 120° C. with the amount of time at a temperature in such range being from about 4 hours to about 40 hours.

The solid product of this method is separated from the reaction medium by conventional methods, such as by filtering and water washing.

DESCRIPTION OF SPECIFIC EMBODIMENTS

When the present method for preparing a high-silica zeolite Alpha containing platinum-group metal within the zeolite pores is followed, an increase in the rate of crystallization at a given reaction temperature is achieved when compared to the conventional prior art methods of manufacturing zeolites Alpha and ZK-4. Such rates of crystallization may be improved by as much as 15 times or more depending upon such factors as exact reaction mixture composition within the given range, raw materials used and aging and heating conditions within the given ranges. This faster rate of crystallization allows for numerous benefits, some of which include increased production rate for any given crystallization vessel and less energy required for the heating step of the production method. It also permits the synthesis of zeolite Alpha containing a platinum-group metal within the zeolite pores because of shorter exposure to the high temperature required for crystallization. For example, the present improved process requires an aging time at ambient temperature of 40 hours or less and a crystallization time at 100° C. of 16 hours compared with 72–240 hours crystallization time for conventionally prepared zeolite Alpha.

Also aiding the preservation of the cationic platinum-group metal complex in the reaction mixture during crystallization, and thereby insuring the formation of zeolite Alpha containing a platinum-group metal within the zeolite pores, is the substantially reduced alkalinity of the reaction mixture when compared to that required by the conventional method of preparation of zeolite Alpha. The alkalinity, defined as the mole ratio of $(Na_2O+R_2O)/Al_2O_3$, of the conventional method is at least 7.5, while being only from about 2 to about 7 for the present method.

Further, when the present method is followed, a notable reduction in required amount of tetramethylammonium ions (R) in the reaction mixture results when compared to that required for conventional synthesis of zeolite Alpha. For example, the mole ratio of $R_2O/Al_2O_3$ required for the reaction mixture to prepare zeolite Alpha conventionally is at least 5.25. The $R_2O/Al_2O_3$ mole ratio required by the present method is only within the range of 0.4 to 4.8, and preferably within the range of 1.5 to 4.0. Since sources of tetramethylammonium cations are expensive, the present method provides considerable economic advantage over the conventional method for preparation of zeolite Alpha.

A still further improvement provided by the present process is the economics of being able to use commercially available sodium aluminate, silica and tetramethylammonium hydroxide solutions. Also, the intermediate step required for preparation of zeolite ZK-4, U.S. Pat. No. 3,314,752, involving dissolving silica gel in $(CH_3)_4NOH$ is eliminated by the present method. Further, the concentration of $(CH_3)_4NOH$ required for the preparation of zeolite Alpha according to U.S. Pat. No. 3,375,205 is 35–38%. Commercially available $(CH_3)_4NOH$ is only 25% and this may be used in the present method without concentration as would be required for the conventional preparation of zeolite Alpha.

The reaction mixture composition of this invention for the synthesis of high-silica zeolite Alpha containing platinum-group metal within the zeolite pores can be prepared utilizing materials which can supply the appropriate oxide. Such compositions include aluminates, alumina, silicates, silica hydrosol, silica gel, silicic acid and hydroxides. The silicon dioxide reactant of the present method may be a finely dispersed, highly reactive silica such as obtained by precipitation from an aqueous solution of a silicate or by vapor-phase hydrolysis of a silicon halide, e.g., chloride or bromide. The silicon dioxide may also be provided as a colloidal silica sol. It will be understood that each oxide component utilized in the reaction mixture for preparing the high-silica zeolite Alpha containing platinum-group metal within the zeolite pores can be supplied by one or more essential reactants. For example, the tetramethylammonium cation can be supplied by a compound of that cation, such as, for example, the hydroxide or a salt.

The metals of the Periodic Table of Elements included by the term "platinum-group" are the second and third periods of Group VIII, such as, for example, platinum, rhodium, osmium and ruthenium. The source of the platinum-group metal in the reaction mixture may be a variety of compounds which contain a cationic complex of said metal, such as, for example, $[Pt(NH_3)_4]Cl_2$; $[Pt(NH_3)_4]Br_2$; $[Pt(NH_3)_4](OH)_2$; $[Pt(NH_3)_4](NO_3)_2$; $[Rh(NH_3)_5Cl]Cl_2$ and $[Ru(H_2N-CH_2-CH_2-NH_2)_3]Cl_3$.

The reaction mixture can be prepared either batchwise or continuously. Crystal size and crystallization time of the presently prepared high-silica zeolite Alpha containing a platinum-group metal within the zeolite pores will vary with the nature of the reaction mixture employed, but in any event the crystallization time will be significantly less than that for the conventional preparation of zeolites of type A structure.

The high-silica zeolite Alpha as prepared hereby exhibits substantially the X-ray powder diffraction pattern as shown in U.S. Pat. No. 3,375,205.

The zeolite composition will have a formula in terms of mole ratios of oxides in the anhydrous state, as follows: $(10^{-6}$ to $0.05)M:(0.02$ to $0.43)R_2O:(0.57$ to $0.99)Na_2O:Al_2O_3:(3.3$ to $7)SiO_2$ wherein R is a tetramethylammonium cation and M is a platinum-group metal.

The original sodium cations of the as synthesized high-silica zeolite Alpha hereby prepared can be replaced, if desired, in accordance with techniques well known in the art, at least in part, by ion exchange with other cations. Preferred replacing cations include metal ions, ammonium ions, hydrogen ions and mixtures thereof. Particularly preferred cations include hydrogen and metals of Groups IIA, IVA, IB, IIB, IIIB, VIB and VIIB of the Periodic Table.

Of the replacing metallic cations, particular preference is given to cations of metals such as, for example, rare earth, Mn, Ca, Mg, Zn, Cd, Cu, Sn, and Ag.

Typical ion exchange technique would be to contact the zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. No. 3,140,249; 3,140,251; and 3,140,253.

Following contact with the salt solution of the desired replacing cation, the zeolite is then preferably washed with water and dried at a temperature ranging from 65° C. to about 320° C., and thereafter may be calcined in air or another suitable gas at temperatures ranging from about 480° C. to 820° C. for periods of time ranging from 1 to 48 hours or more to produce a catalytically-active thermal decomposition product thereof. Even without ion-exchange of original sodium cations, or prior to ion-exchange, the zeolite Alpha hereby prepared may be calcined in air or other suitable gas at temperatures ranging from about 480° C. to 820° C. for periods of time ranging from 1 to 48 hours or more to produce a catalytically-active thermal decomposition product thereof.

Regardless of the cation replacing the alkali metal in the synthesized form of the zeolite, if ion exchange is conducted, the spatial arrangement of the aluminum, silicon and oxygen atoms which form the basic crystal lattice of the zeolite remains essentially unchanged by the described replacement of alkali metal as determined by X-ray powder diffraction of the ion-exchanged material.

The zeolite prepared in accordance hereto should be dehydrated at least partially before use as a catalyst. This can be done by heating to a temperature in the range of about 65° C. to about 820° C. in suitable atmosphere, such as air, nitrogen, hydrogen, etc. and at atmospheric or subatmospheric pressure for between 1 and 48 hours. Dehydration can also be performed at lower temperature merely by placing the catalyst in a vacuum, but a longer time is required to obtain a sufficient amount of dehydration.

The aluminosilicate prepared by the instant invention is shaped in a wide variety of particle sizes. Generally speaking, the particles can be in the form of a crystalline powder or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

In the case of many catalysts, it is desired to combine the high-silica zeolite Alpha hereby prepared with another material resistant to the temperatures and other conditions employed in organic conversion processes. Such matrix materials include active and inactive materials and synthetic or naturally occurring zeolites as well as inorganic materials such as clays, silica and/or metal oxides. The latter may be either naturally occurring or in the form of gelatinous precipitates, sols or gels including mixtures of silica and metal oxides.

Inactive materials suitably serve as diluents to control the amount of conversion in a given process. Frequently, zeolites have been incorporated into naturally occurring clays, e.g. bentonite and kaolin. These materials, i.e. clays, oxides, etc., function, in part, as binders for the catalyst. It is desirable to provide a catalyst having good crush strength to keep the catalyst particles from breaking up in the process.

Naturally occurring clays which can be composited with the hereby synthesized zeolite Alpha containing platinum-group metal within the zeolite pores include the montmorillonite and kaolin families, which include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the zeolite hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided zeolite and organic oxide gel matrix vary widely with the crystalline aluminosilicate content ranging from about 1 to about 90 percent by weight and more usually in the range of about 2 to about 50 percent by weight of the composite.

While the improved zeolite prepared in accordance hereto may be used in a wide variety of organic compound, e.g., hydrocarbon compound, conversion reactions, it is notably useful in the processes requiring shape-selectivity for straight-chain organic, e.g., hydrocarbon compounds, such as, for example, selectoforming, hydrodewaxing, selective cracking of n-paraffins in hydrocarbon mixtures, selective oligomerization of straight-chain olefins and others.

In employing the high-silica zeolite Alpha prepared in accordance herewith as a catalyst for selectoforming, a chargestock of reformate will be contacted therewith at a temperature between about 260° C. and about 550° C., a weight hourly space velocity of between about 0.5 $hr^{-1}$ and about 60 $hr^{-1}$ and a pressure between about 50 psig and about 3000 psig. In employing a catalyst of the zeolite hereby synthesized for hydrodewaxing of waxy chargestocks, such as, for example, kerosines, waxy gas oils and shale oils, in order to reduce pour and freeze points, such chargestocks can be contacted therewith at a temperature between about 370° C. and about 427° C., a pressure from about 200 psig to about 1500 psig, a weight hourly space velocity between about 0.5 $hr^{-1}$ and about 30 $hr^{-1}$ and a hydrogen/chargestock ratio of from about 3000 to about 7000 scf/bbl. When the presently prepared zeolite is used as a component in a cracking catalyst for bringing about shape-selective cracking of the normal paraffins formed in a cracking process, such as gas oil cracking, thereby increasing the octane number of the gasoline boiling range materials produced by said cracking process, contact of the feedstock with said catalyst may be at a temperature of from about 390° C. to about 595° C., a pressure of about atmospheric and a weight hourly space velocity of from about 0.5 $hr^{-1}$ to about 10 $hr^{-1}$.

In order to more fully illustrate the nature of the invention and the manner of practicing same, the following examples are presented.

EXAMPLE 1

A 7.85 gram quantity of sodium aluminate (43.3 wt. % $Al_2O_3$ and 27.8 wt. % $Na_2O$) was dissolved in 20 grams of water. A 0.05 gram quantity of a 50% solution of sodium hydroxide and 57.6 grams of a 25% solution of tetramethylammonium hydroxide were then added. A 0.1088 gram quantity of tetrammine platinum (II) chloride (55.11 wt. % Pt) was dissolved in 3.1 grams of water and then added to the above mixture. Finally, 22.2 grams of precipitated silica (90 wt. % solids) was added to the mixture, said total mixture then being allowed to age at ambient temperature for 24 hours. The aged mixture was then heated to 100° C. for 16 hours whereupon crystallization was complete. The zeolite product was then flocculated, decanted and reslurried several times and then finally filtered and dried at ambient temperature. The above total reaction mixture had a composition, in terms of mole ratios of oxides, as follows:

| | | |
|---|---|---|
| $SiO_2/Al_2O_3$ | = | 10 |
| $(Na_2O + R_2O)/Al_2O_3$ | = | 3.44 |
| $Na_2O/(Na_2O + R_2O)$ | = | 0.31 |
| $H_2O/(Na_2O + R_2O)$ | = | 35 |
| $M/Al_2O_3$ | = | 0.0092 | wherein R is the tetramethylammonium cation and M is platinum.

The product zeolite of this example was determined to have the structure of zeolite Alpha and a $SiO_2/Al_2O_3$ mole ratio of 6.25. About 60% of the cations in the product zeolite were sodium. The zeolite contained 0.35 wt. % platinum within the zeolite pores (ignited weight basis) and sorbed 12.4 grams of n-hexane/100 grams of zeolite (20 mm Hg and 25° C.).

EXAMPLE 2

Twenty grams of the product zeolite of Example 1 was refluxed with 3 batches of 300 cc of 0.5 N $NH_4Cl$ solution for one hour each. The zeolite was then washed with water until essentially free of chloride ions and dried at ambient temperature. The product contained 0.2 wt. % Na.

EXAMPLE 3

The exchanged zeolite product of Example 2 was slugged and sized to 10/14 mesh and 3.5 cc of this material was then placed in a reactor. While in the reactor, it was calcined at 10° C./minute to 550° C. in a stream of 300 cc moist nitrogen (bubbled through water at ambient temperature) per minute. The temperature was then lowered to 400° C. and air was introduced into the nitrogen stream gradually. The amount of air was gradually increased until the zeolite was being exposed to only air at a temperature of 550° C. for 30 minutes.

At a reaction temperature of 482° C. and reaction pressure of 500 psig of hydrogen flowing at 4 liters per minute, feedstock of a 1:1 mixture of n-hexane:2-methylpentane was passed through the reactor. Conversion was measured after 1 hour and 6 hours on stream with results as follows:

| Wt. % Conversion of | After 1 hour | After 6 hours |
|---|---|---|
| n-hexane | 61.2 | 64.9 |
| 2-methylpentane | 1.3 | 0.6 |

The Selectivity Factor of the catalyst used in the reaction of Example 3 is defined as follows:

$$\text{Selectivity Factor} = \frac{\log(1 - \text{fraction of n-hexane converted})}{\log(1 - \text{fraction of 2-methylpentane converted})}$$

It was calculated to be 72 after 1 hour on stream and 174 after 6 hours on stream.

The Gas Factor of the catalyst used in Example 3 is defined as follows:

$$\text{Gas Factor} = \frac{\text{Weight of } C_3 \text{ and } C_4 \text{ in product}}{\text{Weight of } C_1 \text{ and } C_2 \text{ in product}}$$

It was calculated to be 27.8 after 1 hour on stream and 25.3 after 6 hours on stream.

EXAMPLE 4

For comparison purposes, the same procedure and reaction were carried out with a catalyst comprising a commercially available shape-selective cracking catalyst instead of the zeolite prepared in accordance hereto in the reactor. After about one hour on stream, only 53.8 weight percent conversion of n-hexane and a full 14.5 weight percent conversion of 2-methylpentane were observed. The Selectivity Factor for this catalyst was only 4.9 and the Gas Factor was only 6.8. Therefore, the zeolite prepared in accordance with the present invention is considerably more active and more selective as a catalyst than the catalyst used in Example 4.

EXAMPLE 5

A reaction mixture was prepared as in Example 1 except that the platinum complex used therein was omitted. The same procedures of aging, crystallization, flocculation, decantation, filtration and drying as in Example 1 were followed. The product zeolite of this example was determined to have the structure of zeolite Alpha. The product zeolite sorbed 11.5 grams of n-hexane/100 grams of zeolite (20 mm Hg and 25° C.).

EXAMPLE 6

Twenty grams of the product of Example 5 was refluxed with 3 batches of 340 cc of 0.5 N $NH_4Cl$ solution for one hour each. The zeolite was then washed with water until essentially free of chloride ions. The product was divided into two equal parts. One part was slurried with 25 cc of an aqueous solution containing 0.04 grams of tetrammine platinum (II) chloride and stirred for one hour. After filtration, the solid was washed chloride-free and dried at ambient temperature. The product contained 0.35% platinum (ignited weight basis).

The dried zeolite was sized and calcined as described in Example 3.

After neutralizing the acid sites with ammonia and reducing the platinum with hydrogen, a 1:1 mixture of butene-1 and isobutylene, was passed with an excess of hydrogen through the reactor (as in Example 3) containing 1 gram of catalyst.

A 1 gram quantity of the product zeolite of Example 2, treated in as in Example 3, was also used as a catalyst in the reaction of this example. The results of these tests are presented below:

| Product of Example 2 | | | | Product of Example 5 | | |
|---|---|---|---|---|---|---|
| $H_2/$ HC | Temp. °F. | Conversion, % | | | Temp. °F. | Conversion, % |
| | | $C_4(1)=$ | $i\text{-}C_4=$ | $H_2/HC$ | | $C_4(1)=$ $i\text{-}C_4=$ |
| 1.25 | 401 | 55.1 | 7.4 | 1.33 | 456 | 61.7 22.6 |
| 1.25 | 425 | 59.2 | 9.5 | 2.5 | 460 | 70.0 33.0 |
| | | | | 2.5 | 464 | 75.7 36.6 |

Both catalysts were then treated with triphenylphosphine in order to poison external platinum. After this treatment, the product of Example 5 (external Pt) did not catalyze the hydrogenation reaction. The product of Example 2 (internal Pt) gave the following results:

| $H_2/HC$ | Temp. °F. | Conversion, % | |
|---|---|---|---|
| | | $C_4(1)=$ | $i\text{-}C_4=$ |
| 1.67 | 360 | 63.5 | 0 |
| 2.5 | 435 | 69.7 | 0 |
| 2.5 | 460 | 74.4 | 0 |

EXAMPLE 7

In this example, the reaction mixture was identical to that of Example 1, except that the tetrammine platinum (II) chloride was replaced by 0.172 gram of pentammine chloro rhodium (III) chloride. The product, identified as zeolite Alpha, contained 0.18 wt. % Rh within the zeolite pores, calculated on ignited weight basis. It sorbed 15.1 grams of n-hexame/100 grams of zeolite at 25° C. and 20 mm Hg.

EXAMPLE 8

An ammonium ion-exchange of the zeolite product of Example 7 was carried out in the same manner as in Example 6. Calcination prior to catalytic evaluation was carried out in the same manner as described in Example 3. After neutralizing the acid sites with ammonia and reducing the rhodium with hydrogen, a 1:1 mixture of butene-1 and isobutylene, with an excess of hydrogen, was passed through the reactor (as in Example 3) containing 1 gram of catalyst.

The zeolite displayed excellent shape-selectivity in the hydrogenation of these olefins, even without poisoning of external rhodium, indicating that the amount of rhodium on the external surface of the zeolite in comparison to the amount within zeolite pores was extremely low. The results of this experiment were as follows:

| $H_2/HC$ | Temp. °F. | Conversion, % | |
|---|---|---|---|
| | | $C_4(1)=$ | $i\text{-}C_4=$ |
| 2.5 | 340 | 75.0 | 4.2 |
| 3.33 | 350 | 97.3 | 7.7 |

EXAMPLE 9

In this example, the reaction mixture was identical to that of Example 1, except that the tetrammine platinum (II) chloride was replaced by an iridium complex prepared by addition of 50% ethylenediamine solution to concentrated iridium chloride solution containing 0.06 gram of iridium. The mixture was aged for 48 hours at ambient temperature and then crystallized at 100° C. for 16 hours. The product, identified as having the structure of zeolite Alpha, contained 0.44 wt. % iridium within the zeolite pores (ignited weight basis).

What is claimed is:

1. A method for synthesizing crystalline aluminosilicate zeolite Alpha containing platinum-group metal within the zeolite pores which comprises the steps of preparing a reaction mixture containing sources of sodium oxide, tetramethylammonium oxide, aluminum oxide, silicon dioxide, a cationic platinum-group metal complex and water and having a composition, in terms of mole ratios of oxides, falling within the following ranges:

| | |
|---|---|
| SiO$_2$/Al$_2$O$_3$ | = 4.0–12.0 |
| H$_2$O/(Na$_2$O + R$_2$O) | = 15.0–40.0 |
| (Na$_2$O + R$_2$O)/Al$_2$O$_3$ | = 2.0–7.0 |
| Na$_2$O/(Na$_2$O + R$_2$O) | = 0.2–0.75 |
| M/Al$_2$O$_3$ | = 10$^{-6}$–0.06 | wherein R is a tetramethylammonium cation and M is a platinum-group metal, aging said mixture for from about 2 hours to about 100 hours at a temperature of from about 10° C. to about 70° C., and then heating said mixture at a temperature of from about 80° C. to about 150° C. until crystals of said zeolite are formed.

2. The method of claim 1 wherein the temperature in the heating step is maintained between about 90° C. and about 120° C.

3. The method of claim 1 wherein the silicon dioxide comprises a finely dispersed silica obtained by precipitation from an aqueous solution of a silicate.

4. The method of claim 1 wherein the silicon dioxide comprises a finely dispersed silica obtained by vapor phase hydrolysis of a silicon halide.

5. The method of claim 1 wherein the silicon dioxide comprises a colloidal silica sol.

6. The method of claim 1 which comprises the further step of replacing, at least in part, the original sodium cations of said zeolite by ion exchange with a cation or a mixture of cations selected from the group consisting of hydrogen and metals from Groups IIA, IVA, IB, IIB, IIIB, VIB and VIIB of the Periodic Table of Elements.

7. The method of claim 2 which comprises the further step of replacing, at least in part, the original sodium cations of said zeolite by ion exchange with a cation or a mixture of cations selected from the group consisting of hydrogen and metals from Groups IIA, IVA, IB, IIB, IIIB, VIB and VIIB of the Periodic Table of Elements.

8. The method of claim 3 which comprises the further step of replacing, at least in part, the original sodium cations of said zeolite by ion exchange with a cation or a mixture of cations selected from the group consisting of hydrogen and metals from Groups IIA, IVA, IB, IIB, IIIB, VIB and VIIB of the Periodic Table of Elements.

9. The method of claim 4 which comprises the further step of replacing, at least in part, the original sodium cations of said zeolite by ion exchange with a cation or a mixture of cations selected from the group consisting of hydrogen and metals from Groups IIA, IVA, IB, IIB, IIIB, VIB and VIIB of the Periodic Table of Elements.

10. The method of claim 5 which comprises the further step of replacing, at least in part, the original sodium cations of said zeolite by ion exchange with a cation or a mixture of cations selected from the group consisting of hydrogen and metals from Groups IIA, IVA, IB, IIB, IIIB, VIB and VIIB of the Periodic Table of Elements.

11. The method of claim 1 wherein the temperature in the aging step is ambient.

12. The method of claim 2 wherein the temperature in the aging step is ambient.

13. The method of claim 3 wherein the temperature in the aging step is ambient.

14. The method of claim 4 wherein the temperature in the aging step is ambient.

15. The method of claim 5 wherein the temperature in the aging step is ambient.

16. The method of claim 1 which comprises the further step of heating said zeolite to a temperature in the range of 65° C. to 820° C.

17. The method of claim 2 which comprises the further step of heating said zeolite to a temperature in the range of 65° C. to 820° C.

18. The method of claim 3 which comprises the further step of heating said zeolite to a temperature of from 65° C. to about 820° C.

19. The method of claim 4 which comprises the further step of heating said zeolite to a temperature of from 65° C. to about 820° C.

20. The method of claim 5 which comprises the further step of heating said zeolite to a temperature of from 65° C. to about 820° C.

21. The method of claim 6 which comprises the further step of heating said zeolite to a temperature of from 65° C. to about 820° C.

22. The method of claim 7 which comprises the further step of heating said zeolite to a temperature of from 65° C. to about 820° C.

23. The method of claim 8 which comprises the further step of heating said zeolite to a temperature of from 65° C. to about 820° C.

24. The method of claim 9 which comprises the further step of heating said zeolite to a temperature of from 65° C. to about 820° C.

25. The method of claim 10 which comprises the further step of heating said zeolite to a temperature of from 65° C. to about 820° C.

26. The method of claim 6 wherein the temperature of said further step is from 480° C. to about 820° F.

27. The method of claim 7 wherein the temperature of said further step is from 480° C. to about 820° F.

28. The method of claim 8 wherein the temperature of said further step is from 480° C. to about 820° F.

29. The method of claim 9 wherein the temperature of said further step is from 480° C. to about 820° F.

30. The method of claim 10 wherein the temperature of said further step is from 480° C. to about 820° F.

31. The method of claim 26 wherein the temperature of said further step is approximately 550° C.

32. The method of claim 27 wherein the temperature of said further step is approximately 550° C.

33. The method of claim 28 wherein the temperature of said further step is approximately 550° C.

34. The method of claim 29 wherein the temperature of said further step is approximately 550° C.

35. The method of claim 30 wherein the temperature of said further step is approximately 550° C.

36. The method of claim 1 wherein said platinum-group metal of said complex is a metal from the second and third periods of Group VIII of the Periodic Table of Elements.

37. The method of claim 2 wherein said platinum-group metal of said complex is a metal from the second and third periods of Group VIII of the Periodic Table of Elements.

38. The method of claim 6 wherein said platinum-group metal of said complex is a metal from the second and third periods of Group VIII of the Periodic Table of Elements.

39. The method of claim 11 wherein said platinum-group metal of said complex is a metal from the second and third periods of Group VIII of the Periodic Table of Elements.

40. The method of claim 16 wherein said platinum-group metal of said complex is a metal from the second and third periods of Group VIII of the Periodic Table of Elements.

41. The method of claim 36 wherein said metal from the second and third periods of Group VIII is selected from the group consisting of platinum, rhodium, iridium and ruthenium.

42. The method of claim 37 wherein said metal from the second and third periods of Group VIII is selected from the group consisting of platinum, rhodium, iridium and ruthenium.

43. The method of claim 38 wherein said metal from the second and third periods of Group VIII is selected from the group consisting of platinum, rhodium, iridium and ruthenium.

44. The method of claim 39 wherein said metal from the second and third periods of Group VIII is selected from the group consisting of platinum, rhodium, iridium and ruthenium.

45. The method of claim 40 wherein said metal from the second and third periods of Group VIII is selected from the group consisting of platinum, rhodium, iridium and ruthenium.

* * * * *

UNITED STATES PATENT AND TRADEMARK OFFICE
CERTIFICATE OF CORRECTION

PATENT NO. : 4,191,663
DATED : March 4, 1980
INVENTOR(S) : Guenter H. Kuehl

It is certified that error appears in the above-identified patent and that said Letters Patent are hereby corrected as shown below:

Column 10, lines 33-42, Claims 26-30:

"820°F" should read --820°C--.

Signed and Sealed this

Tenth Day of March 1981

[SEAL]

Attest:

RENE D. TEGTMEYER

Attesting Officer

Acting Commissioner of Patents and Trademarks